(12) United States Patent
Ingram (10) Patent No.: US 10,514,185 B2
(45) Date of Patent: Dec. 24, 2019

(54) INTEGRATED TRACKING DRIVE AND MOUNT

(71) Applicant: Focal Line Solar LLC, Poplarville, MS (US)

(72) Inventor: John Ingram, Poplarville, MS (US)

(73) Assignee: Focal Line Solar LLC, Poplarville, MS (US)

(*) Notice: Subject to any disclaimer, the term of this patent is extended or adjusted under 35 U.S.C. 154(b) by 853 days.

(21) Appl. No.: 14/948,676

(22) Filed: Nov. 23, 2015

(65) Prior Publication Data

US 2017/0146264 A1    May 25, 2017

(51) Int. Cl.
*F24S 30/425* (2018.01)
*F24S 23/74* (2018.01)
*F24S 30/00* (2018.01)

(52) U.S. Cl.
CPC ............ *F24S 30/425* (2018.05); *F24S 23/74* (2018.05); *F24S 2030/115* (2018.05); *F24S 2030/133* (2018.05); *Y02E 10/45* (2013.01); *Y02E 10/47* (2013.01)

(58) Field of Classification Search
CPC ....... F24J 2/38; F24J 2002/5458; B25J 9/104; B25J 9/1045; Y10T 74/18832; F24S 2030/133; F24S 2030/136; F24S 2030/115
USPC .................... 74/89.2, 89.21, 89.22
See application file for complete search history.

(56) References Cited

U.S. PATENT DOCUMENTS

| | | | |
|---|---|---|---|
| 1,661,473 A | 3/1928 | Goddard et al. | |
| 4,178,913 A | 12/1979 | Hutchinson | |
| 4,306,540 A * | 12/1981 | Hutchison | F24J 2/14 126/607 |
| 4,864,317 A | 9/1989 | Sorko-Ram | |
| 4,875,052 A | 10/1989 | Anderson et al. | |
| 5,404,723 A | 4/1995 | Parker et al. | |
| 5,634,794 A * | 6/1997 | Hildreth | G05G 5/03 434/37 |
| 5,798,517 A | 8/1998 | Berger | |
| 2011/0174097 A1 * | 7/2011 | Bergamasco | F16H 19/0622 74/89.22 |
| 2015/0107583 A1 * | 4/2015 | Doyle | F24J 2/38 126/714 |

* cited by examiner

*Primary Examiner* — Jorge A Pereiro
(74) *Attorney, Agent, or Firm* — Sheppard Mullin Richter & Hampton LLP (57) ABSTRACT

An integrated drive leg and mount suitable for solar power devices, such as trough solar concentrators or PV panels. A drive system including a linear actuator is integrated into the support structure. A pulley assembly converts the linear force into rotational motion, thereby providing tracking adjustments for a solar power device following the sun avoiding larger external electric drive motor which are situated between successive solar power devices. The integrated nature enables a smaller gap between solar power devices in solar installations, reduces the effect of induced shadowing, and enables greater collection of solar energy.

17 Claims, 9 Drawing Sheets

# INTEGRATED TRACKING DRIVE AND MOUNT

TECHNICAL FIELD

The disclosed technology relates generally to tracking drive systems for solar power devices, and more particularly, some embodiments relate to tracking drive systems integrated into a support structure.

DESCRIPTION OF THE RELATED ART

The energy output of solar power devices, such as photovoltaic ("PV") panels can be increased by tracking the sun and other solar power devices, such as trough solar concentrators, require tracking the sun to produce power. Tracking is accomplished by moving the solar device in accordance the sun movement. In many cases, moving the solar device utilizes electric motors attached directly or indirectly to the solar device. Tracking for a solar device requires high torque and low speed.

BRIEF SUMMARY OF EMBODIMENTS

According to various embodiments of the disclosed technology, a system is provided integrating the drive mechanism, for moving a solar power device, into the support structure for said device. The system includes a drive system, comprising a linear drive actuator and a pulley assembly for converting the linear motion of the linear actuator into rotational motion. The linear drive actuator is a drive ram or electric actuator. The pulley assembly has one or more rotating elements for converting the linear motion into rotational motion. In some embodiments, the pulley assembly may include two rotating elements, a first rotating element and a second rotating element, with a drive end of the first rotating element connected to the free end of the drive ram. The rotating elements are connected together by one or more wire cables. At least one rotating element is connected to a solar power device, such that when force is applied by the linear actuator, the force is converted into rotational motion, and at least one rotating element applies the rotational motion to the solar power device. The drive system is integrated into a support leg for the solar power device, creating an integrated drive leg with a thin form factor, reducing the space otherwise required to provide a motor for moving a solar power device.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The technology disclosed herein, in accordance with one or more various embodiments, is described in detail with reference to the following figures. The drawings are provided for purposes of illustration only and merely depict typical or example embodiments of the disclosed technology. These drawings are provided to facilitate the reader's understanding of the disclosed technology and shall not be considered limiting of the breadth, scope, or applicability thereof. It should be noted that for clarity and ease of illustration these drawings are not necessarily made to scale.

Some of the figures included herein illustrate various embodiments of the disclosed technology from different viewing angles. Although the accompanying descriptive text may refer to such views as "top," "bottom" or "side" views, such references are merely descriptive and do not imply or require that the disclosed technology be implemented or used in a particular spatial orientation unless explicitly stated otherwise.

The figures are not intended to be exhaustive or to limit the invention to the precise form disclosed. It should be understood that the invention can be practiced with modification and alteration, and that the disclosed technology be limited only by the claims and the equivalents thereof.

DETAILED DESCRIPTION OF THE EMBODIMENTS

Tracking the movement of the sun during the day and adjusting the orientation of solar power devices, such as PV panels and concentrators, increases the amount of solar energy that may be collected and converted into usable electricity and/or thermal energy. Many such adjustments may need to be made during the course of a day due to the constant rotation of the Earth. Tracking averaged speed is 0.25 degrees per minute but typical tracker rotational rates are up to a hundred times faster. The torque required to provide the necessary adjustments can range up to thousands of Newton-meters ("Nm"), depending on the size and configuration of the solar power device and the effect of wind conditions.

Traditionally, such movements have been achieved through the use of electric drive motors. The power from such motors is generally transferred to the solar power device through a speed reducing system, such as a gearbox or chain, to change the speed and torque to that required to make the tracking adjustments. Electric drive motors, however, are not optimal for solar tracking device applications. Tracking for solar power devices requires minimal power, but at high torque and extremely low speed. Most motors sized for the necessary power requirements of solar tracking devices have low torque. In order to meet the necessary torque requirements, large gear sets or needlessly large motors, or a combination of both, are employed. Such motors also require the use of brake or holding mechanism for when the motor is not running, in order to maintain the orientation of the solar power device. These requirements greatly increase the overall cost of such drive systems, thereby increasing the overall cost of solar power device with tracking capability.

Moreover, in some solar power configurations, the size of electric drive motors injects inefficiency into the system. For example, Trough solar concentrators employ one or more curved mirrors to concentrate (reflect) sunlight onto a receiver positioned at the focal point of said curved mirrors. Electric drive motors are often situated between two trough solar concentrators to not limit the degree of rotation and to avoid transferring rotary motion over a distance. Such a configuration requires a large gap between the concentrators, which reduces the amount of solar collection in the system due to the shadowing effect, introduced by the gap, on the receiver. To avoid such effects, drive motors are sometimes located some distance away from the solar power device(s) to reduce the gap between devices. However, this requires a torque transfer system, such as long chains or belts, adding complexity to the system.

Embodiments of the technology disclosed herein is directed toward a tracking drive system for use with solar power devices. More particularly, the various embodiments of the technology disclosed herein relate to a tracking drive system that provides sufficient torque and power without the complexity and cost of traditional drive systems employed in solar power systems.

Figure 1:
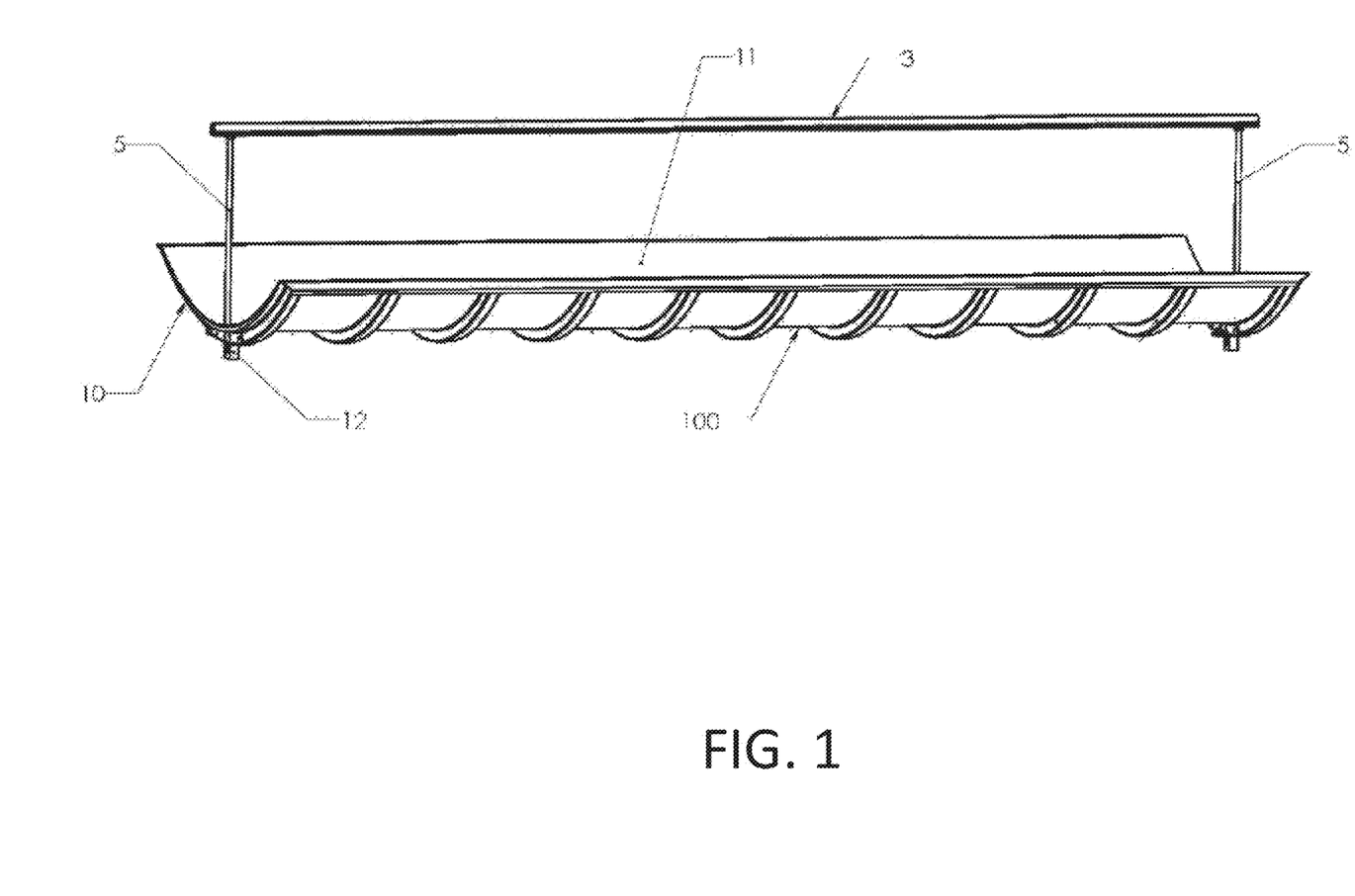
FIG. 1 is an example solar power device with which embodiments of the technology disclosed herein may be implemented.

For ease of discussion, embodiments of the technology disclosed herein are described with respect to embodiments employed with trough solar concentrators. An example trough solar concentrator with which embodiments of the technology disclosed herein may be employed is shown in FIG. 1. As shown, a trough concentrator 10 includes a back shell 100, a mirror 11, a receiver 3 and receiver supports 5, and mounting and pivot points 12. This description should not be read to limit the scope of the technology of the present disclosure. The technology of the present disclosure is applicable to many other types of solar power devices, such as flat panels with PV cells disposed on the surface, solar dishes, etc.

Figure 2:
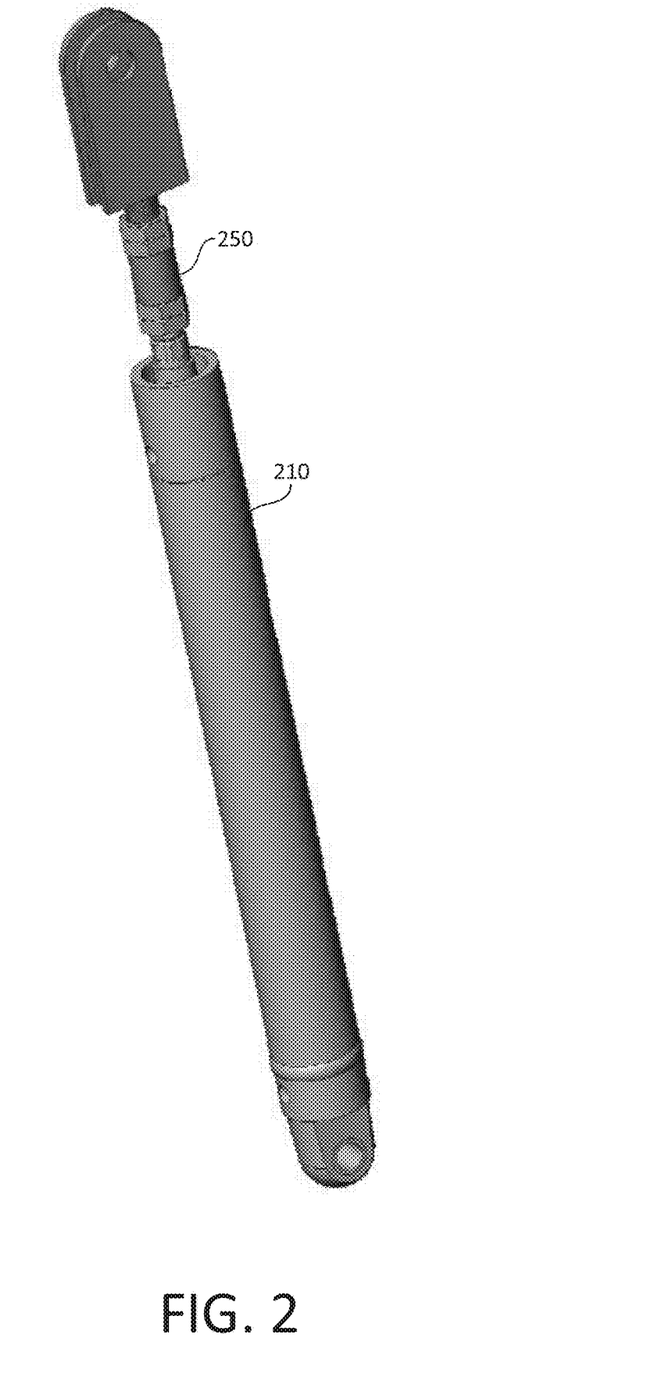
FIG. 2 is an example actuator in accordance with embodiments of the technology of the present disclosure.

FIG. 2 illustrates and example linear actuator 210 of a drive system in accordance with embodiments of the technology disclosed herein. Non-limiting examples of linear actuator 210 that may be employed in embodiments of the technology disclosed herein include: electric actuators; lead-screw, screw jack, ball screw, roller screw, or other mechanical actuators; hydraulic actuators; electro-mechanical actuators; piezoelectric actuators; telescopic actuators; among others. In embodiments utilizing a hydraulic actuator, some embodiments may include a hydraulic pump for each hydraulic actuator. In other embodiments, a central hydraulic pumping station may provide the hydraulic fluid for all the hydraulic actuators within a system of solar tracking devices. Multiple hydraulic pumps may be utilized, each serving several hydraulic actuators within the system. The linear actuator 210 includes a linkage mechanism 250, which connects a drive ram (not pictured), which extends into and out of the linear actuator 210, to a connector section on a pulley. The pulley assembly will be discussed in greater detail with respect to FIG. 3A.

As compared to traditional rotary drive motors, such as the electric drive motor discussed above, the linear actuator 210 provides several benefits. Due to the locking nature of linear actuators, no additional braking or position locking devices are required to maintain position. With traditional rotary drive motors, brakes are necessary to maintain position when the motor is not running but it is not being held from rotating in some other way. With a linear actuator 210, however, the driving ram (not pictured) is locked in its position, with or without removing power to the linear actuator 210.

Figure 3A:
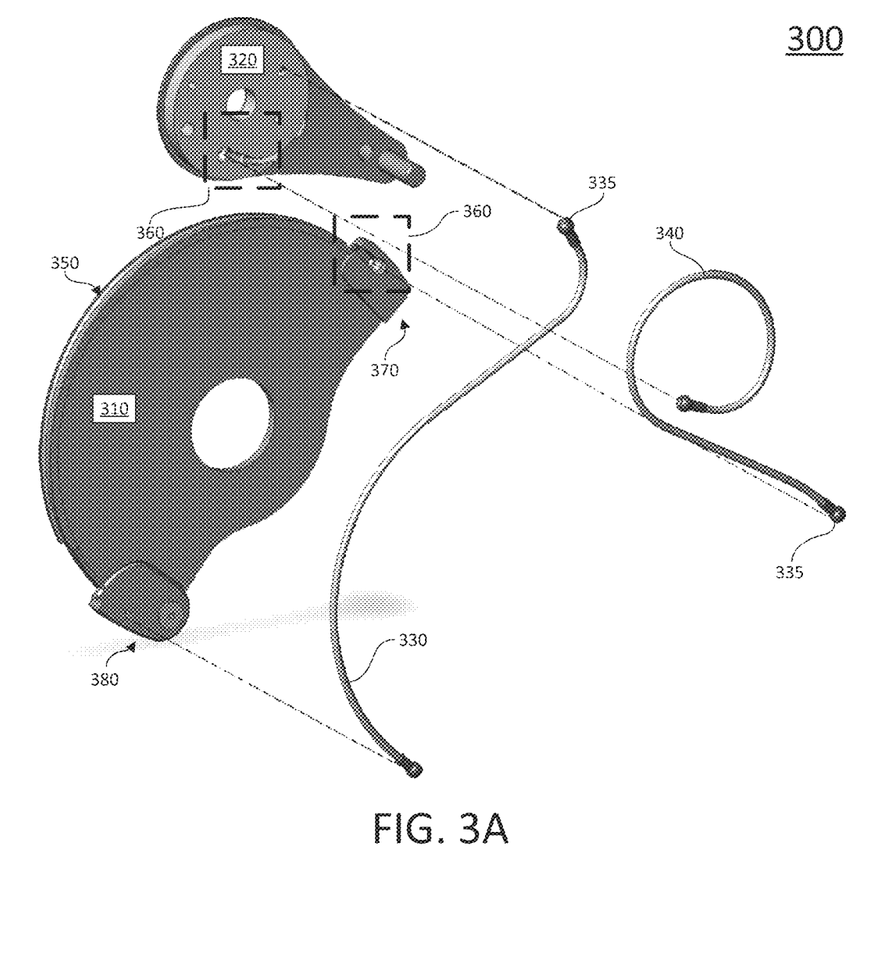
FIGS. 3A and 3B illustrate an example pulley assembly in accordance with embodiments of the technology of the present disclosure.

FIG. 3A is an exploded view of an example pulley assembly 300 for a drive system in accordance with the technology disclosed herein. The pulley assembly 300 translates the linear motion of the drive ram of the linear actuator 210 of FIG. 2 into rotational motion. The pulley system 300 includes a primary rotating element 310 and a secondary rotating element 320. In some embodiments, the second rotating element 320 is connected to a main shaft of the solar tracking device. In various embodiments, the second rotating element is connected to the solar tracking device at a pivot point, such as the mount and pivot point 12 of the example trough solar concentrator 10 of FIG. 1, via a mounting plate, as discussed with respect to FIG. 3B.

In some embodiments, the pulley system 300 may include one or more additional rotating elements. The first rotating element, 310 and the second rotating element 320 may be sized based on the dimensions of the solar power device with which the drive system is employed.

In the illustrated embodiment of FIG. 3A, the first rotating element 310 and the second rotating element 320 are connected via wire cables 330, 340. In various embodiments, a single wire cable (wireline with multi strands) may be utilized to connect the rotating elements. As opposed to belts or chains, wire cables are less susceptible to stretching, which introduces slack into the system. Moreover, wire cables are stronger, stiffer, and flexible, at a fraction of the cost, when comparable belts and chains, which need to be a larger cross section for an equivalent working load limit. Wire cables are also easier to maintain than belts or chains. Belts of the same size will snap at far lower loads than similar sized wire cables. Chains require cogged wheels that may mate with the links of the chain, requiring greater precision in manufacturing, as well as allowing for dust and dirt buildup within the links that can cause mechanical wear issues. Further, wire cables have a longer operating life than both belts and chains, which need to be replaced periodically. In various embodiments, the wire cables may comprise one or more of: steel; stainless steel; aluminum; metal alloys; carbon fiber; or other fibrous material.

The wire cables 330, 340 can be fixed in position on both the first and second rotating elements. In the illustrated embodiment of FIG. 3A, the wire cables 330, 340 include cable end caps 335 that mate with cable lock slots 360 disposed on each of the rotating elements. The location of cable lock slots may vary. For example, in the illustrated embodiment, a cable lock slot 360 may be disposed on the front side of the first rotating element 310 at a free end 370 of the first rotating element 310. A second cable lock slot 360 may be disposed on the back side (not shown) of the first rotating element 310 at a drive end 380 of the first rotating element 310. In other embodiments, the cable lock slots 360 may be disposed on the same face of the first rotating element 310. The cable lock slots 360 may be disposed on the faces of the second rotating element 320 in a similar way as that described for the first rotating element. In some embodiments, the second rotating element 320 may be in a similar shape to the first rotating element 310. In other embodiments, the second rotating element 320 may be cylindrical or elliptical, and the cable lock slots 360 may be disposed anywhere on either face of the second rotating element 320. The location of the cable lock slots 360 on the second rotating element 320 may be configured based on the desired length of the wire cables 330, 340 and on the desired rotational limits of 320.

In embodiments where a single cable it employed, cable lock slots 360 may be disposed on the first rotating element 310, similar to the cable lock slots 360 disposed on the first rotating element 310 in FIG. 3. In such embodiments, the single wire cable may be looped around the second rotating element 320 to result in a similar arrangement as illustrated in FIG. 3. Specifically, the single cable may be looped around the second rotating element 320 such that the cable crosses by itself in the space under the second rotating element 320 and above the first rotating element 310.

In various embodiments, the wire cables 330, 340 may be connected to the first rotating element 310 and the second rotating element 320 by inserting the respective cables ends 335 of wire cables 330, 340. One wire cable 330 is connected to the cable lock slot 360 disposed at the drive end 380 of the first rotating member 310, while the other wire cable 340 is connected to the cable lock slot 360 disposed on the free end 370 of the first rotating member 310. The opposite end of each wire cable 330, 340 is connected into respective cable lock slots 360 disposed on the second rotating element 320.

Figure 3B:
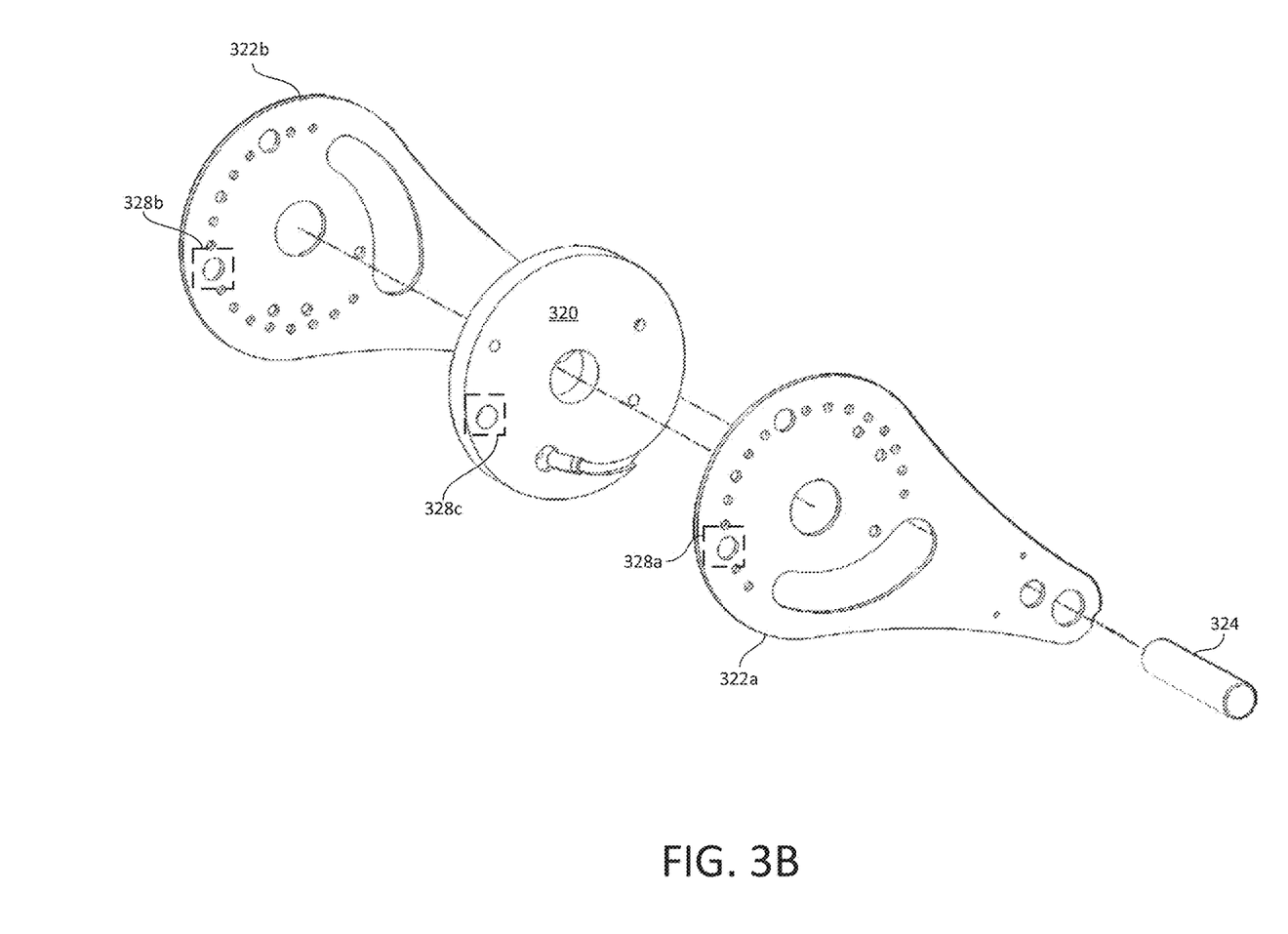

As discussed above, the second rotating element 320 may be connected to the solar tracking device via a torque transfer plate. FIG. 3B is an exploded view of a second rotating element 320 and torque transfer plates 322a, 322b, in accordance with various embodiments of the technology of the present disclosure. As illustrated in FIG. 3B, the second rotating element 320 is disposed in a space defined by a first torque transfer plate 322a and a second torque transfer plate 322b. Torque transfer plates 322a, 322b may be attached to rotating element 320 by welding or mechanical fasteners. In various embodiments, the first torque transfer plate 322a may be configured to connect to a first solar tracking device and the second torque transfer plate 322b may be configured to connect to a second solar tracking device. For example, embodiments of the integrated drive leg having (discussed below) including the pulley assembly 300 may be implemented in a solar installation utilizing trough concentrators, with the integrated drive leg may be positioned between two neighboring trough concentrators. In such implementations, torque transfer plate 322a and 322b are connected to the each other by torque bar 324. Torque bar 324 is connected to a trough on each of its free ends. In this way, the second rotating element 320 may rotate both trough concentrators at the same time. This limits the number of drive motors necessary for an installation, as a single drive motor can move two separate solar tracking devices.

The second rotating element 320 may be designed to incorporate a zero position indicator hole 328c. In various embodiments, the alignment holes 328a, 328b disposed on the first torque transfer plate 322a and the second torque transfer plate 322b, respectively, may be used to identify the correct position of a connected solar power device in relation to the zero position. In this way, each solar tracking device may be positioned accurately with respect to a zero position and or with respect to other solar power devices in a string. In various embodiments, a torque rod 324 may be included to assist in tying torque transfer plates 322a, 322b together.

In various embodiments, the alignment holes 328a, 328b may also be utilized to lock or secure the solar tracking device in a given position. By inserting one or more pins into the alignment holes 328a, 328b, it is possible to lock each solar tracking device. Locking each solar tracking device is beneficial for maintaining position during extreme weather, such as high wind gusts, and servicing the solar tracking device. When corresponding alignment hole 328c disposed on the second rotating element 320 and matching holes 328a, 328b, are aligned at the zero position they will further align with locking holes disposed in the front plate 601a and back plate 601b, discussed with respect to FIG. 6. When the solar tracking device is aligned at the zero position, a pin may be inserted through the locking holes of the plates 601a, 601b and inserted into alignment holes 328a, 328b, 328c, thereby locking the solar device in its zero position.

As discussed above, the drive system in accordance with the technology disclosed herein comprises a linear actuator (e.g., the hydraulic actuator 210 of FIG. 2) and a pulley system assembly (e.g., the pulley system assembly 300 of FIG. 3A). Although described with respect to the example embodiments of FIGS. 2 and 3, other embodiments of the drive system may include different components, such as combinations of alternative linear actuator embodiments and/or pulley assembly embodiments.

Figure 4:
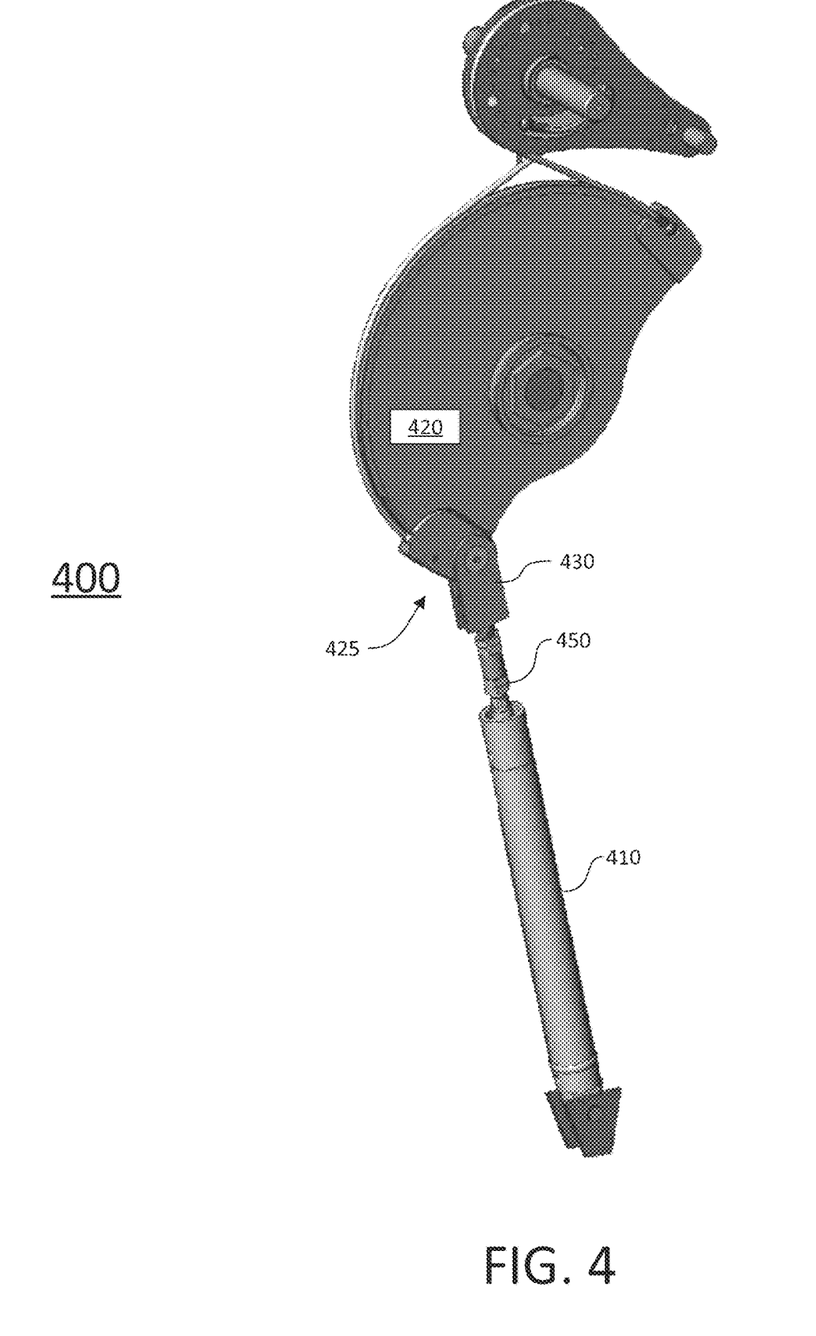
FIG. 4 is an example drive system, without supporting structure, in accordance with embodiments of the technology of the present disclosure.

FIG. 4 Illustrates an example drive system 400 in accordance with embodiments of the technology disclosed herein. The drive ram (not pictured) of the linear actuator 410 is connected to the first rotating element 420 at a drive end 425 of the first rotating element 420. In some embodiments, the drive ram may have a connector 430, the connector 430 being configured to connect with the drive end 425 of the first rotating element 420. In the illustrated embodiment, one end of the connector 430 is connected to the drive end 425 via a link pin and the other end is connected to the linkage mechanism 450. Linkage mechanism 450 is connected to the drive ram. Other embodiments may use another type of connection, such as a clamp, bolt, screw, or other mechanical connection means. Linkage mechanism 450 in this embodiment is configured as a turnbuckle, with opposite threading on either end, one with clockwise rotation the other with counterclockwise rotation. In this fashion the linkage mechanism 450 when rotated in one direction will shorten the distance and when rotated in the opposite direction will lengthen the distance. As such linkage mechanism 450 can be used to compensate for difference in the zero position of the actuator (fully retracted) and the zero position of the locked pulley as described earlier.

As discussed above, one of the downsides of traditional electric drive motors for solar tracking device installations is the size or form factor of such motors. For example, electric drive motors used in trough solar concentrator installations are generally placed on one end of the device, and situated between two trough solar concentrators. Essentially, the addition of the electric drive motor is treated like an afterthought, merely being bolted on after the mounting and support structure is designed and installed. Due to the particular requirements of drive systems for solar tracking devices (high torque, low speed), traditional electric drive motors are ill suited because they have large form factors, and generally require large gearboxes to convert the output power to the necessary torque-speed requirements. This increases the overall cost, as larger motors generally cost more than smaller motors.

Moreover, the size and positioning of traditional electric drive motors between the collectors causes inefficiencies in solar collection. Specifically the spacing caused dark spots (shadowing) on the trough solar concentrator receiver due to the positioning of the electric drive motor which increase spacing which then leads to shadowing of the receiver, ultimately reducing the overall energy output of the trough solar concentrator. Due to the induced shadow caused by the motor's required increase spacing, less solar light is concentrated on the receiver of the trough solar concentrator as that space without a mirror cannot reflect light.

Figure 5:
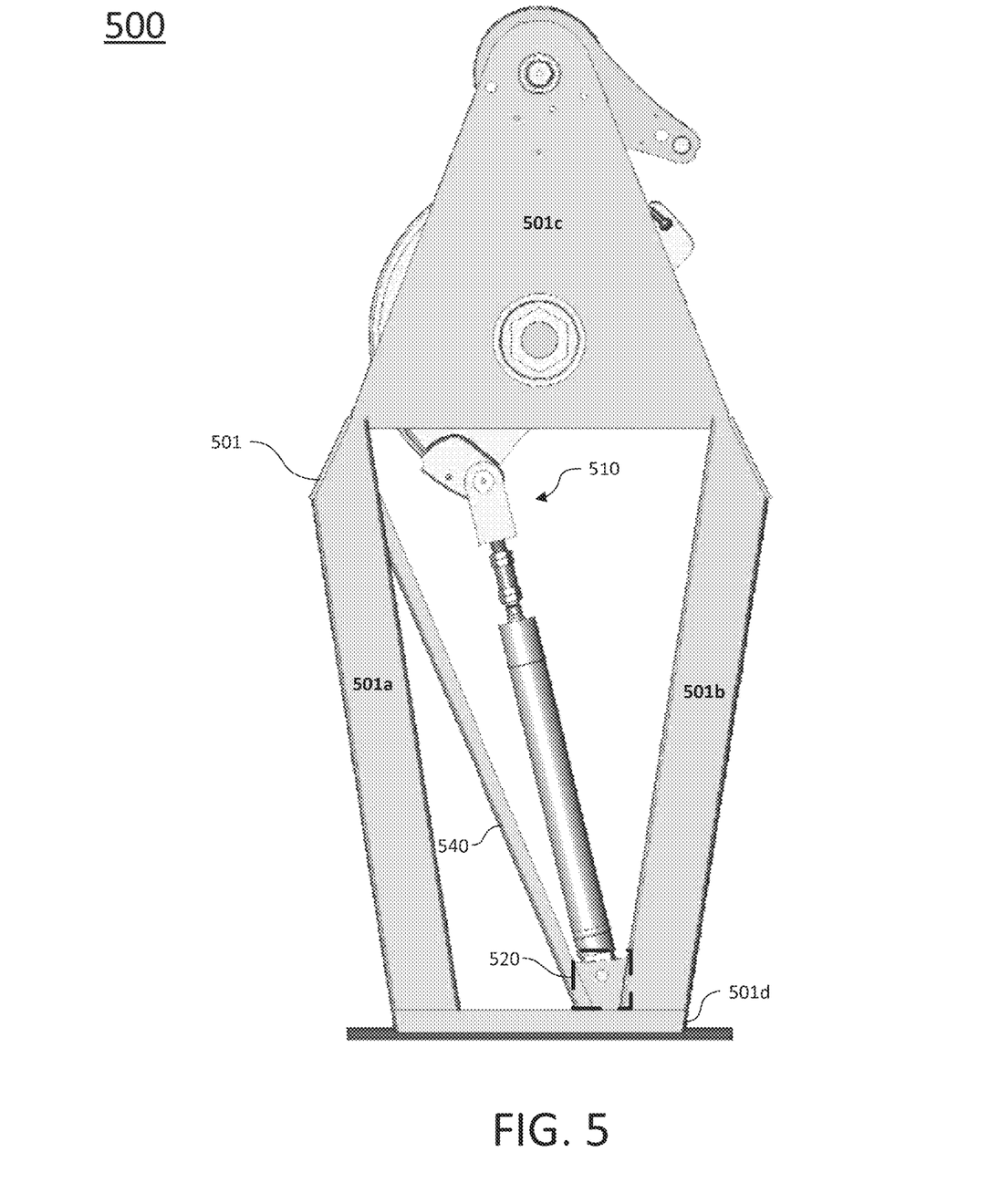
FIG. 5 is an example integrated drive leg in accordance with embodiments of the technology of the present disclosure.

Due to the design of the embodiments of the drive system in accordance with the technology of the present disclosure, said drive system can be integrated into the support structure of the solar power device to minimize the inefficiency associated with the size of traditional electric drive motors. FIG. 5 illustrates an example drive leg 500 in accordance with the technology of the present disclosure.

FIG. 5 illustrates an example integrated drive leg 500 in accordance with the technology of the present disclosure. The integrated drive leg 500 serves both as a support structure for a solar power device, as well as providing the drive force for making tracking adjustments by including a drive system 510, similar to the drive system 400 described with respect to FIG. 4. As illustrated in FIG. 5, the integrated drive leg 500 includes supports 501a, 501b, and a mount section 501c. In other embodiments 501a, 501b, 501c and 501d may altogether be of one or two stamped pieces in a clamshell configuration with the drive components contained within. A drive system connector 520 may be included to provide a base mounting point for the drive system 510. In various embodiments, the drive system connector 520 may be a bolt section disposed on a base 501d of the integrated drive leg 500, on a support 501a, 501b of the integrated drive leg 500, or a combination thereof.

Figure 6:
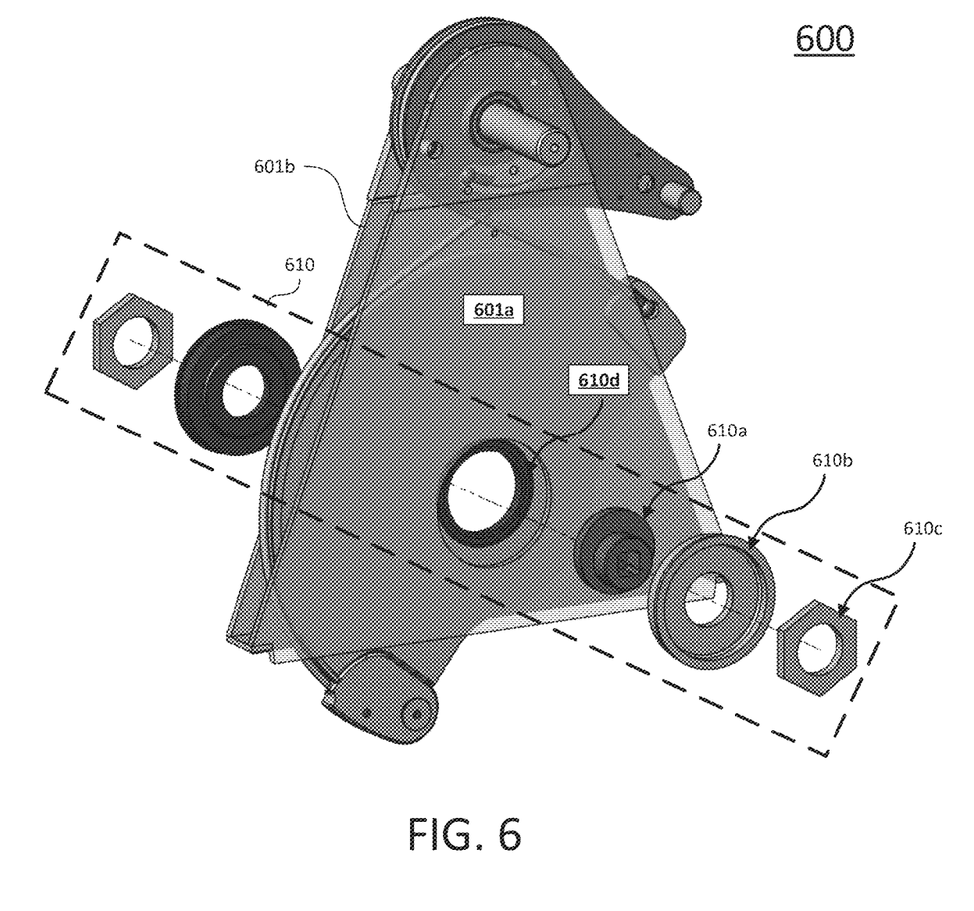
FIG. 6 is an example mount section of an example integrated drive leg in accordance with embodiments of the technology of the present disclosure.

As discussed above, the integrated drive leg includes a mount section. FIG. 6 illustrates an example mount section 600 in accordance with the technology disclosed herein. As illustrated in FIG. 6, the mount section 600 may comprise two mounting plates, a front plate 601a and a back plate 601b. The front plate 601a is transparent in the illustrated example to show a pulley assembly, similar to the example pulley assembly discussed with respect to FIGS. 3A and 3B. The two plates 601a, 601b are connected by a cam assembly 610. In addition to serving as a connector between the two plates 601a, 601b, and rotation center for the first rotating element, the cam assembly 610 enables tensioning of the cables of the pulley assembly to allow for easy installation, as well as eliminate slack to ensure accurate motion control following installation. Such tensioning can accommodate manufacturing errors in cable length, as well as accounting for possible stretching of the wire cables over time by allowing the system to be re-tensioned. The cam assembly 610 comprises a cam 610a, cam nuts 610c, and supporting collars 610b. After installation of the pulleys and cables of the pulley assembly, the cam 610a may be rotated to apply the proper tension to the cables. In various embodiments, the cam 610a may be threaded on a front side, a back side, or both. To tighten the cam 610a, a wrench may be inserted into a wrench slot on the cam. In some embodiments, the wrench slot may be square- or hexagonal-shaped. In various embodiments, the support collars 610b may enable for a larger opening in the front plate 601a and/or back plate 601b to allow for installation of the cam 610a. The rotating element may include a bearing 610d configured to mate with the cam 610a and enable the rotating element to rotate freely. The support collars 610b may be welded to the front plate 601a and/or back plate 601b in various embodiments to lock the cam 610a within the mount section 600. Over time, the cables may stretch, reducing the tension in the pulley assembly. The cam 610a may be rotated to retension the cables, accounting for slack caused by age.

As illustrated in FIG. 6, the two plates 601a, 601b of the mount section 600 may leave an open side(s) allowing portions of the pulley assembly to be located outside of the integrated drive leg. In other embodiments, the two plates 601a, 601b may be designed to fully encapsulate the pulley assembly. In various embodiments, the mount section 600 may be a unibody structure with an opening on one end, which can be placed over the pulley assembly, similar to a sleeve.

Figure 7:
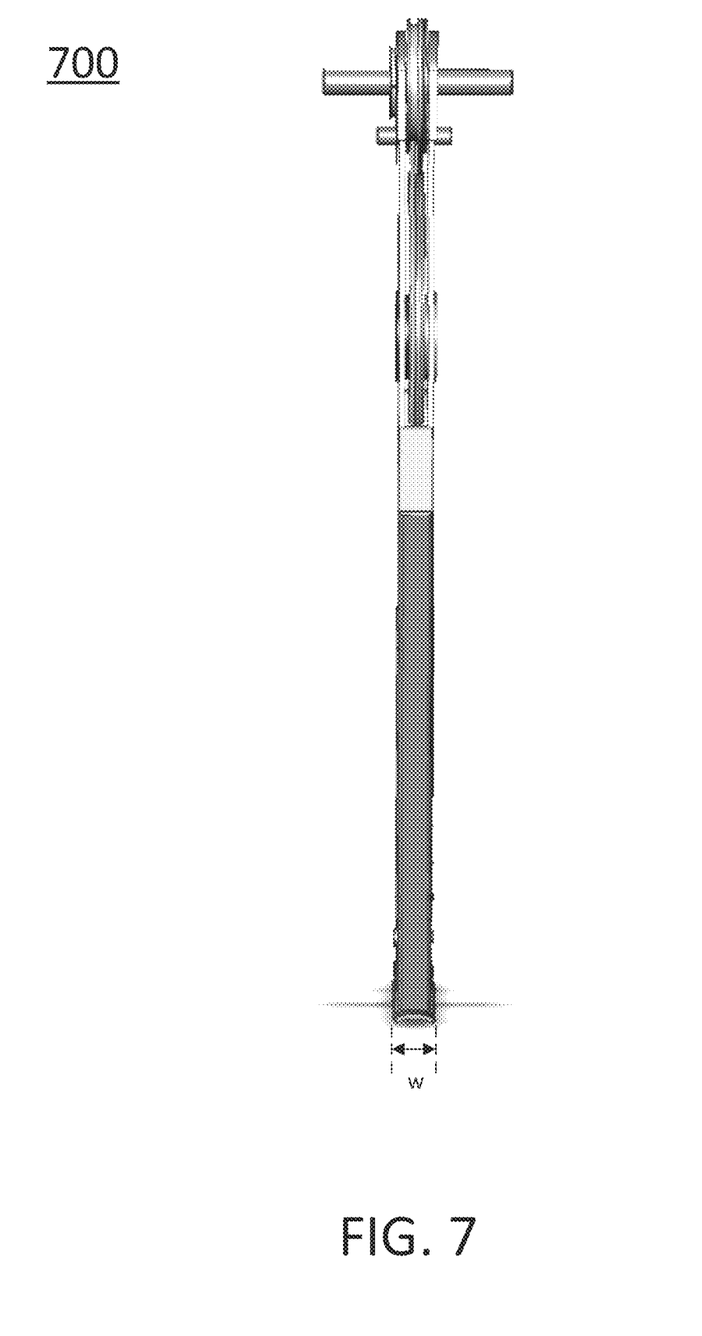
FIG. 7 is a side profile view of an example integrated drive leg in accordance with the technology of the present disclosure.

Several benefits can be obtained by combining the drive system within the support for a solar power device to form an integrated drive leg. Because of the smaller form factor and design of the example drive system, the integrated drive leg is thin, reducing the size of the gap between solar power devices, such as trough solar concentrators. FIG. 7 illustrates a side view of an example integrated drive leg 700, similar to the integrated drive leg of 500 discussed with respect to FIG. 5. As illustrated in FIG. 7, the drive system is within the space defined by the supports, base, and mount section, similar to the supports 501a, 501b, base 501d, and the mount section 501c discussed with respect to FIG. 5. In other words, the drive system is encompassed within the total width w of the integrated drive leg 700. Therefore, both structural support and drive power is provided within the same form factor, eliminating additional space required for traditional, bolt-on electric drive motors. In some embodiments, the width w could be as small as 15 mm to 250 mm wide. In other embodiments, the width w may be as wide as necessary based on the design of the solar concentrator and/or the drive motor. The overall width w may depend on the maximum force required based on the size and configuration of the solar power device. In one embodiment, the solar tracking device may require a maximum torque of 950 ft-lb (1288 Nm) at the axis of the solar power device, resulting in an integrated drive leg having a width w of 50 mm. In some embodiments, the drive system may have a width minimally greater than the width w of the integrated drive leg 700. By integrated the drive system within the integrated drive leg 700, however, the gap between neighboring solar tracking devices can still be minimized.

Due to the thin nature of the integrated drive leg 700, the gap between neighboring solar power devices may be reduced, minimizing the induced shadowing effect. The size of the gap may be slightly larger than the width w (to provide space for the solar power device to move without touching the leg). In other words, the gap need only be marginally bigger than the integrated drive leg 700, eliminating the need for additional space to attach an electric drive motor. As such, the shadowing effect can be reduced.

Additionally, the small width w of the integrated drive leg 700 enables for a more efficient configuration and operation of solar power devices. For example, in a trough solar concentrator installation having multiple concentrators arranged next to each other, it is common that light be reflected off of one concentrator mirror and impact the receiver of a neighboring concentrator. Due to the Earth's tilt, the sun is rarely in a position directly perpendicular to the surface of the trough solar concentrators. Therefore, light rays from the sun most of the time strike the mirror of a first trough concentrator at an angle, resulting in angular reflections of light that may impact the receiver of a first trough solar concentrator. However, a portion of the angular reflections of light will actually be directed towards the receiver of a neighboring (successive) trough solar concentrator. With a gap between the two concentrators and given the angular nature of the reflections, it is clear that any gap will cause a black space (previously referred to also as induced shadow or shadowing effect) on the receiver. However, by reducing the gap between neighboring concentrators, the black space on the successive receiver of another concentrator can be reduced, increasing the amount of total solar energy collected by the entire trough solar concentrator installation. This increase in efficiency highlights a loss in the current arrangements relying on traditional electric drive motors requiring large gaps.

Figure 8A:
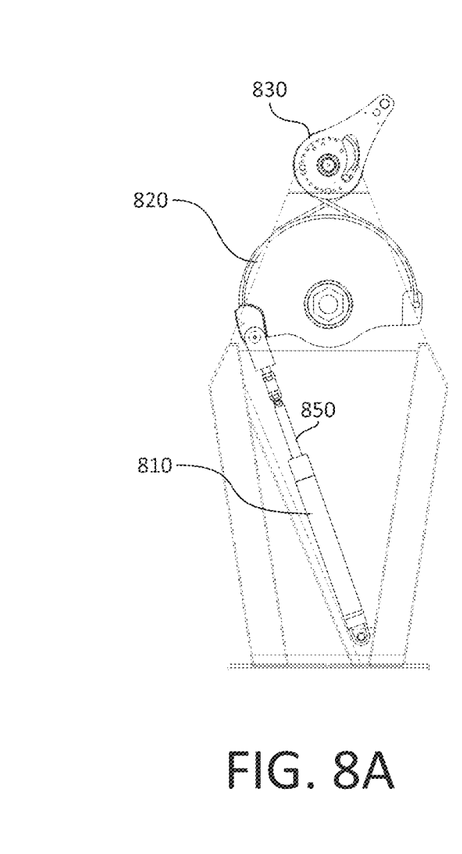
FIGS. 8A, 8B, and 8C illustrate the interaction between an example drive system and pulley assembly of an example integrated drive leg in accordance with embodiments of the technology disclosed herein.
Figure 8B:
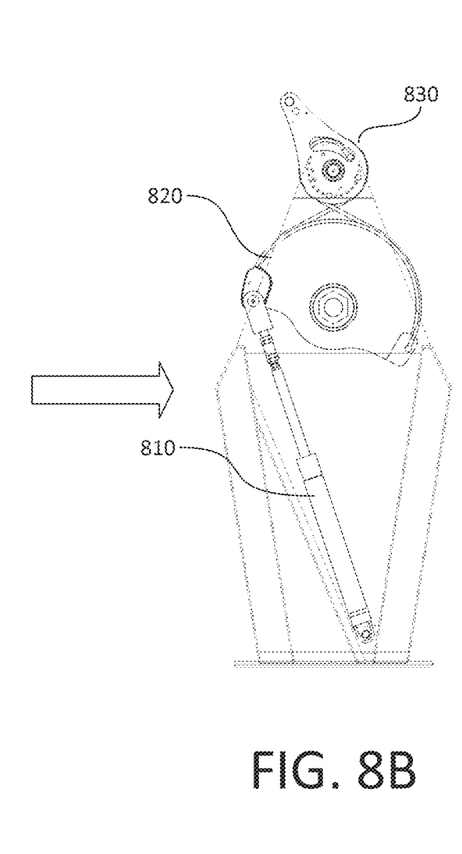
Figure 8C:
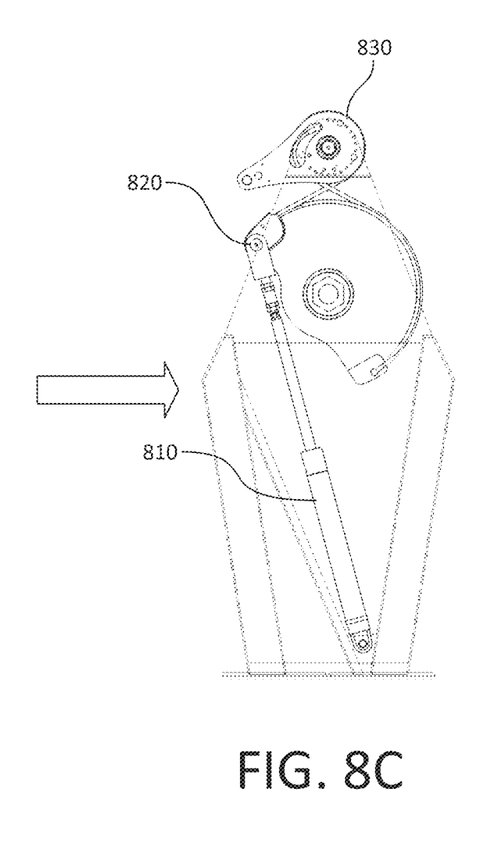

FIGS. 8A, 8B, and 8C illustrate different states of motion of the integrated drive leg in accordance with embodiments of the technology of the present disclosure. The drive system 810 asserts a linear force upwards when moving from the position of FIG. 8A to the position in FIG. 8B. The linear force of the drive system 810 pushes the first pulley 820 of the pulley assembly. As illustrated in FIG. 8A, the drive ram 850 (which has been referenced previously but not shown) may be seen in the example integrated drive leg. The pulley 820 transforms the linear motion of the drive system 810 into rotational motion, which is transferred to the second pulley 830 of the pulley assembly. As seen when moving from FIG. 8A to FIG. 8C, the transformation of the linear force of the drive system 810 into rotational motion by the pulleys 820, 830 causes the positioning of a solar device connected to the second pulley 830 to change.

While various embodiments of the disclosed technology have been described above, it should be understood that they have been presented by way of example only, and not of limitation. Likewise, the various diagrams may depict an example architectural or other configuration for the disclosed technology, which is done to aid in understanding the features and functionality that can be included in the disclosed technology. The disclosed technology is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the technology disclosed herein. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosed technology is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosed technology, whether or not such embodiments are described and whether or not such features are presented as being a part of a described embodiment. Thus, the breadth and scope of the technology disclosed herein should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A system for tracking solar power devices, comprising:
   a linear drive actuator having a drive ram with a linkage mechanism, the linkage mechanism comprising a connector disposed on a distal end;
   a first rotating element having a drive end and a free end, the drive end connected to the linkage mechanism of the drive ram of the linear drive actuator via the connector of the linkage mechanism configured to mate with the drive end of the first rotating element;
   a second rotating element, the second rotating element connected to the first rotating element by one or more wire cables;
   a support structure encompassing the linear drive actuator, the first rotating element, and the second rotating element to form an integrated drive leg; and
   a solar power device, wherein the second rotating element is connected to the solar power device.

2. The system of claim 1, wherein a width of the linear drive actuator is equal to a width of the support structure.

3. The system of claim 1, wherein the linear drive actuator comprises one of: an electric actuator; mechanical actuator, such as a leadscrew, screw jack, ball screw, or roller screw; an electro-mechanical actuator; a piezoelectric actuator; a telescopic actuator; or a hydraulic actuator.

4. The system of claim 3, wherein the linear drive actuator is a hydraulic actuator, and the system further comprises a hydraulic pump for controlling the hydraulic actuator.

5. The system of claim 1, further comprising a first wire cable, the first rotating element further comprising two cable lock slots disposed on a surface of the first rotating element, wherein a first end of the first wire cable is connected to a first cable lock slot disposed near the drive end of the first rotating element and a second end of the first wire cable is connected to a second cable lock slot disposed near a free end of the first rotating element such that the first wire cable is looped around the second rotating element.

6. The system of claim 1, comprising a first wire cable, a second wire cable, two cable lock slots disposed on a surface of the first rotating element, and two cable lock slots disposed on a surface of the second rotating element.

7. The system of claim 6, wherein a first end of the first wire cable is connected to a first cable lock slot disposed near the drive end of the first rotating element, a second end of the first wire cable is connected to first cable lock slot disposed on the second rotating element, a first end of the second wire cable is connected to a second cable lock slot disposed on the second rotating element, and a second end of the second wire cable is connected to a second cable lock slot disposed near a free end of the first rotating element.

8. The system of claim 7, wherein the one or more wire cables comprise one or more of: steel; stainless steel; aluminum; copper; metal alloys; carbon fiber; or fibrous material.

9. The system of claim 1, wherein the one or more wire cables comprise one or more of: steel; stainless steel; aluminum; copper; metal alloys; carbon fiber; or fibrous material.

10. The system of claim 1, wherein the connector is connected to the drive end by one or more of: a link pin; a screw; a bolt; or a clamp.

11. The system of claim 1, wherein the solar power device is a trough solar concentrator, and the integrated drive leg is disposed on one end of the trough solar concentrator.

12. The system of claim 1, the second rotating element further comprising a plurality of alignment holes.

13. The system of claim 1, wherein the width of the integrated drive leg is between 15 mm and 250 mm.

14. A solar concentrator installation, comprising:
an integrated drive leg comprising:
a linear drive actuator having a drive ram with a linkage mechanism;
a first rotating element having a drive end and a free end, the drive end connected to the linkage mechanism of the drive ram of the linear drive actuator;
a second rotating element, the second rotating element connected to the first rotating element by one or more wire cables; and
a support structure encompassing the linear drive actuator, the first rotating element, and the second rotating element; and
a first solar concentrator and a second solar concentrator;
wherein the integrated drive leg is disposed in a space between the first solar concentrator and the second solar concentrator, and the second rotating element is connected to the first solar concentrator and the second solar concentrator.

15. The solar concentrator installation of claim 14, wherein the linear drive actuator comprises one of: an electric actuator; mechanical actuator, such as a leadscrew, screw jack, ball screw, or roller screw; an electro-mechanical actuator; a piezoelectric actuator; a telescopic actuator; or a hydraulic actuator.

16. The solar concentrator installation of claim 14, comprising a first wire cable, a second wire cable, two cable lock slots disposed on a surface of the first rotating element, and two cable lock slots disposed on a surface of the second rotating element.

17. The solar concentrator installation of claim 14, wherein a first end of the first wire cable is connected to a first cable lock slot disposed near the drive end of the first rotating element, a second end of the first wire cable is connected to first cable lock slot disposed on the second rotating element, a first end of the second wire cable is connected to a second cable lock slot disposed on the second rotating element, and a second end of the second wire cable is connected to a second cable lock slot disposed near a free end of the first rotating element.

\* \* \* \* \*